Sept. 11, 1928.
G. C. THOMAS, JR
1,683,742
OUTLET BOX CONSTRUCTION
Filed April 4, 1924
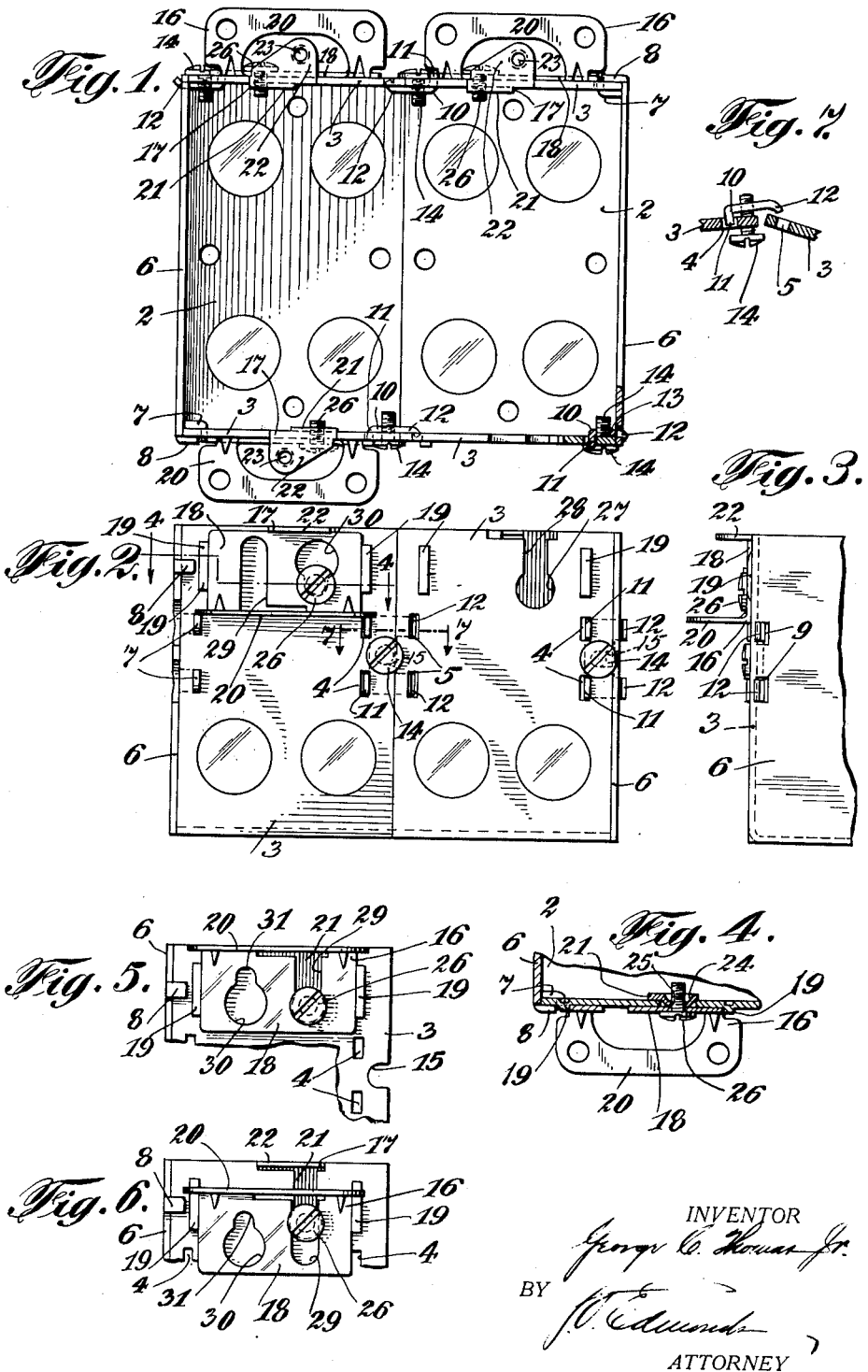
INVENTOR
George C. Thomas Jr.
BY
ATTORNEY Patented Sept. 11, 1928.

1,683,742

UNITED STATES PATENT OFFICE.

GEORGE C. THOMAS, JR., OF ELIZABETH, NEW JERSEY, ASSIGNOR TO THE THOMAS & BETTS CO., OF ELIZABETH, NEW JERSEY, A CORPORATION OF NEW JERSEY.

OUTLET-BOX CONSTRUCTION.

Application filed April 4, 1924. Serial No. 704,101.

My invention relates to outlet box construction, and more particularly relates to the construction of outlet boxes of the gangable type, including adjustable means for supporting the box on a wall or partition, and including means for supporting electrical switches, or other devices, in the box.

One object of my invention is to provide a simplified and inexpensive gangable outlet box construction which comprises a reduced number of parts and which requires a reduced number of adjustments in extending or reducing the size of the box, or in placing the box supporting means in various positions of adjustment. Another object is to provide a gangable outlet box construction including improved coupling elements and box supporting elements which are adapted to be retained ready for use on certain of the box body parts, at all times, thus preventing these elements from becoming lost, and eliminating the necessity of handling these elements as separate detached pieces when the box is being extended or reduced.

More particularly, my objects include the provision of a gangable outlet box construction wherein an end plate may be secured to or may be detached from either end of a body section by merely tightening or loosening a single screw, and wherein two body sections may be secured to or may be detached from each other by merely tightening or loosening two screws, the complete removal of the screws being not required.

My objects also include the provision of a construction wherein a single screw serves to detachably retain a switch supporting element and a box supporting element on a box wall, these elements being attachable to and removable from the wall without requiring the screw to be removed from the switch supporting element, and permitting removal, adjustment and reversal of the box supporting element without removing the screw from the wall, thus facilitating assembly and adjustment of the parts, reducing the number which must be handled separately, and conserving time and labor.

Other objects of my invention will be in part obvious and in part pointed out hereinafter.

My invention accordingly consists in the features of construction, combinations of elements, and arrangement of parts, which will be hereinafter set forth, and the scope of the application of which will be indicated in the claims that follow.

Attention is hereby directed to the accompanying drawings, forming a part of this application and showing one possible embodiment of my invention, and in which:—Fig. 1 is a top view of an outlet box construction embodying my invention; Fig. 2 is a side view of the same; Fig. 3 is an end view of a portion of the construction; Fig. 4 is a sectional view of a portion of the construction and is taken on the line 4—4 of Fig. 2; Fig. 5 is an end view of the same portion of the construction but shows the box supporting element mounted in a different position of adjustment; Fig. 6 is a view similar to Fig. 5 but shows the box supporting element in a third position of adjustment; and Fig. 7 may be said to be taken on the line 7—7 of Fig. 2.

Similar reference characters refer to similar parts throughout the several views of the drawings.

Referring to the drawings, the box units are preferably struck up from sheet metal, but obviously may be cast, or they may be otherwise formed of metal or other material as desired. There are similar U-shaped body sections, each having a bottom 2 and similar opposite side walls 3. Each side wall has apertures 4 adjacent one edge and apertures 5 adjacent its other edge. 6 designates similar end plates, each having along one side edge offset claws 7 and a lug 8, and having apertures 9 adjacent the other side edge. Any two body sections may be detachably secured together, or any end plate may be detachably secured to either end of any body section, by means of identical clips 10. Each clip 10 has on one side claws 11 which are engageable in the apertures 4 of any side wall 3 and has on its opposite side claws 12 which are angular, extending for a distance in the plane of the clip body and then being bent at their ends, and which are engageable alternatively with the apertures 5 in any side wall 3 and with the apertures 9 of any end plate 6. The body of each clip 10 has a threaded hole 13 for a screw 14. Each side wall 3 has a notch 15 into or out of which the shank of the screw 14 may be moved while the screw is in engagement with a clip to take the clip claws 11 into or out of engagement in the wall apertures 4. When mounted on a side wall the clip is adjustable by means of screw 14 to move its claws transversely of the plane of the wall. The adjustment may be such that the clip is maintained on one wall and at the same time is ready for use and adjustment to secure another body section on an end plate to the body section on which the clip is mounted.

When it is desired to secure two body sections together they are placed side by side. A clip is engaged with each two adjacent side walls and they become firmly clamped together when the clip screws are tightened. The head of the screw is preferably wide enough to overlap the adjacent walls to render the connection more firm. To disconnect the body sections from each other it is merely necessary to loosen each clip sufficiently to release one wall. It has been found possible to secure two body sections together and to disconnect them from each other by loosening only one clip and having the other tight. The attachment or detachment at the tight clip may be accomplished by canting the parts. It will be apparent that two body sections may be secured together or may be disconnected from each other without removing the screw from either clip and without removing either clip from the wall on which it is carried.

To attach an end plate 6 to either end of a body section, the offset claws 7 of the plate are engaged in the apertures 5 on one side wall of the body section, and at the same time the plate lug 8 seats against the outside of this wall. The apertures 9 at the opposite edge of the end plate are placed on the claws 12 of a clip 10, which may be maintained loosely on the opposite side wall of the body section, and when the clip screw 14 is tightened, the plate 6 will be firmly and securely clamped to the body section. To apply or to remove an end plate from a body section only this one screw need be adjusted, and it is not necessary to remove the screw from the clip nor the clip from the body section. The body of the clip does not extend beyond the edge of the wall on which the clip is carried, thus permitting the end plate to be brought flush against the wall edge. The head of the clip screw 14 preferably is wide enough to overlap the plate edge to secure a firmer connection.

In combination with the above construction I preferably provide box supporting elements 16 whereby the outlet box may be secured in place in a wall or other structure, and elements 17 for detachably supporting cover plates, switches or other units in or on the box. Elements 16 have a flange 18 adapted to seat against the side of a body section wall between two guide bosses 19 formed on the wall, and have a box attachment flange 20. Elements 17 have a flange 21 seating against the inside of a body section wall and an attachment flange 22 provided with a threaded screw hole 23. At the lower end of flange 21 is a circular boss 24 provided with a threaded hole 25 for a screw 26. Each side wall 3 has an aperture 27 and a slot 28 narrower than the aperture 27 extending therefrom to the top edge of the wall. The boss 24 of the switch supporting element is wider than the slot 28, but is small enough to seat in the aperture 27. The head of the screw 26 is wider than the aperture 27, but its shank may pass through the slot 28. Accordingly, when the screw is tightened, the boss 24 is drawn into the aperture to prevent removal of the switch supporting element from the body section wall, and when the screw is loosened the switch supporting element may be mounted on or removed from the wall without removing the screw from the element.

The flange 18 of each box supporting element 16 has a notch 29 open adjacent the attachment flange 20, and adapted to receive the shank of the screw 26. By adjusting the notch 29 with respect to the screw 26 and then tightening this screw, the box supporting element may be secured to the body section wall in various positions (see Figs. 5 and 6). Alongside of the notch 29, the flange 18 has a key-hole slot comprising an aperture 30, larger than the head of the screw 26, and a communicating slot 31 narrower than the head of the screw, the key-hole slot being so disposed that the box supporting element 16 may be secured to the box in inverted position (as shown in Figs. 2 and 3) by engaging the key-hole slot of the flange 18 with the screw 26. It will be apparent that the element 16 may readily and easily be adjusted and reversed on a box wall without requiring the screw 26 to be removed from the element 17 or from the wall.

As many changes could be made in the above construction, and as many different embodiments of this invention could be made without departing from the scope thereof, it is intended that all matter contained in the above description or shown in the accompanying drawings be interpreted as illustrative and not in a limiting sense.

What I claim is:—

1. In outlet box construction, in combination, a plurality of similar body sections having side wall portions provided adjacent each side edge with similar claw-receiving perforations, similar end plates having claws at one side edge and having claw-receiving perforations at the opposite side edge, said claws fitting the adjacent perforations in a body section, similar clips having claws at each end fitting selectively the adjacent perforations of two abutting body section ends or the adjacent perforations of one body section and an abutting end plate, whereby two body sections or a body section and an end plate may be secured together, and means preventing the claws of an end plate from leaving the apertures in the body section when the end plate is secured to a body section by means of a clip.

2. In outlet box construction, in combination, a plurality of similar body sections having side wall portions provided adjacent each side edge with similar claw-receiving perforations, similar end plates having claws at one side edge and having claw-receiving perforations at the opposite side edge, said claws fitting the adjacent perforations in a body section, similar clips having claws at each end fitting selectively the adjacent perforations of two abutting body section ends or the adjacent perforations of one body section and an abutting end plate, means for detachably securing each clip to a body section, whereby two body sections or a body section and an end plate may be secured together, said means including a screw extending loosely through the body section wall and in threaded engagement with the clip, and means preventing the claws of an end plate from leaving the apertures in the body section when the end plate is secured to a body section by means of a clip.

3. In outlet box construction, in combination, a plurality of similar body sections having side wall portions provided adjacent each side edge with similar claw-receiving perforations, similar end plates having claws at one side edge and having claw-receiving perforations at the opposite side edge, said claws fitting the adjacent perforations in a body section, similar clips having claws at each end fitting selectively the adjacent perforations of two abutting body section ends or the adjacent perforations of one body section and an abutting end plate, means for detachably securing each clip to a body section, whereby two body sections or a body section and an end plate may be secured together, said means including a screw extending loosely through a notch in the body section wall and in threaded engagement with the clip, and means preventing the claws of an end plate from leaving the apertures in the body section when the end plate is secured to a body section by means of a clip.

4. In outlet box construction, in combination, a plurality of similar body sections having side wall portions provided adjacent each side edge with similar claw-receiving perforations, similar end plates having claws at one side edge and having claw-receiving perforations at the opposite side edge, said claws fitting the adjacent perforations in a body section, similar clips having claws at each end fitting selectively the adjacent perforations of two abutting body section ends or the adjacent perforations of one body section and an abutting end plate, means for detachably securing each clip to a body section, whereby two body sections or a body section and an end plate may be secured together, said means including a screw extending loosely through a notch in the body section wall and in threaded engagement with the clip, the clip being on the interior of the body section wall, and means preventing the claws of an end plate from leaving the apertures in the body section when the end plate is secured to a body section by means of a clip.

5. In outlet box construction, in combination, a plurality of similar body sections having side wall portions provided adjacent each side edge with similar claw-receiving perforations, similar end plates having claws at one side edge and having claw-receiving perforations at the opposite side edge, said claws fitting the adjacent perforations in a body section, similar clips having claws at each end fitting selectively the adjacent perforations of two abutting body section ends or the adjacent perforations of one body section and an abutting end plate, means for detachably securing each clip to a body section, said means including a screw extending loosely through a notch in the body section wall and in threaded engagement with the clip, the clip being on the interior of the body section wall, and the head of the screw protruding beyond the edge thereof, whereby the claws of an end plate are prevented from leaving the apertures in the body section when the end plate is secured to a body section by means of a clip.

6. In outlet box construction, the combination with a body section having opposite side walls, similar apertures adjacent each edge of each side wall, an end plate having at one side edge an offset claw adapted to engage in an aperture of either side wall and having a lug adapted to engage against the outside of the engaged wall, said plate having apertures adjacent its opposite side edge, and means, comprising an adjustable clip having claws adapted to engage in said plate apertures and the adjacent apertures in the adjacent side wall, for detachably securing said end plate to said body section on either end thereof.

7. In outlet box construction, the combination with similar body sections, each having similar opposite side walls and similar apertures adjacent each edge of each side wall, similar end plates, each having at one side edge an offset claw adapted to engage in an aperture of either side wall of any one of said body sections and each having a lug adapted to engage against the outside of the engaged wall, each of said plates having apertures adjacent its opposite side edge, a clip having claws adapted to engage selectively with apertures in any two adjacent body section walls and with apertures in either wall of any body section and with the apertures in an adjacent end plate, and means for adjustably mounting said clip on either wall of any body section, whereby selectively any two body sections may be detachably secured together, and any end plate may be detachably secured to either end of any body section.

This specification signed this 2nd day of April, 1924.

GEORGE C. THOMAS, Jr.